Figure 1:
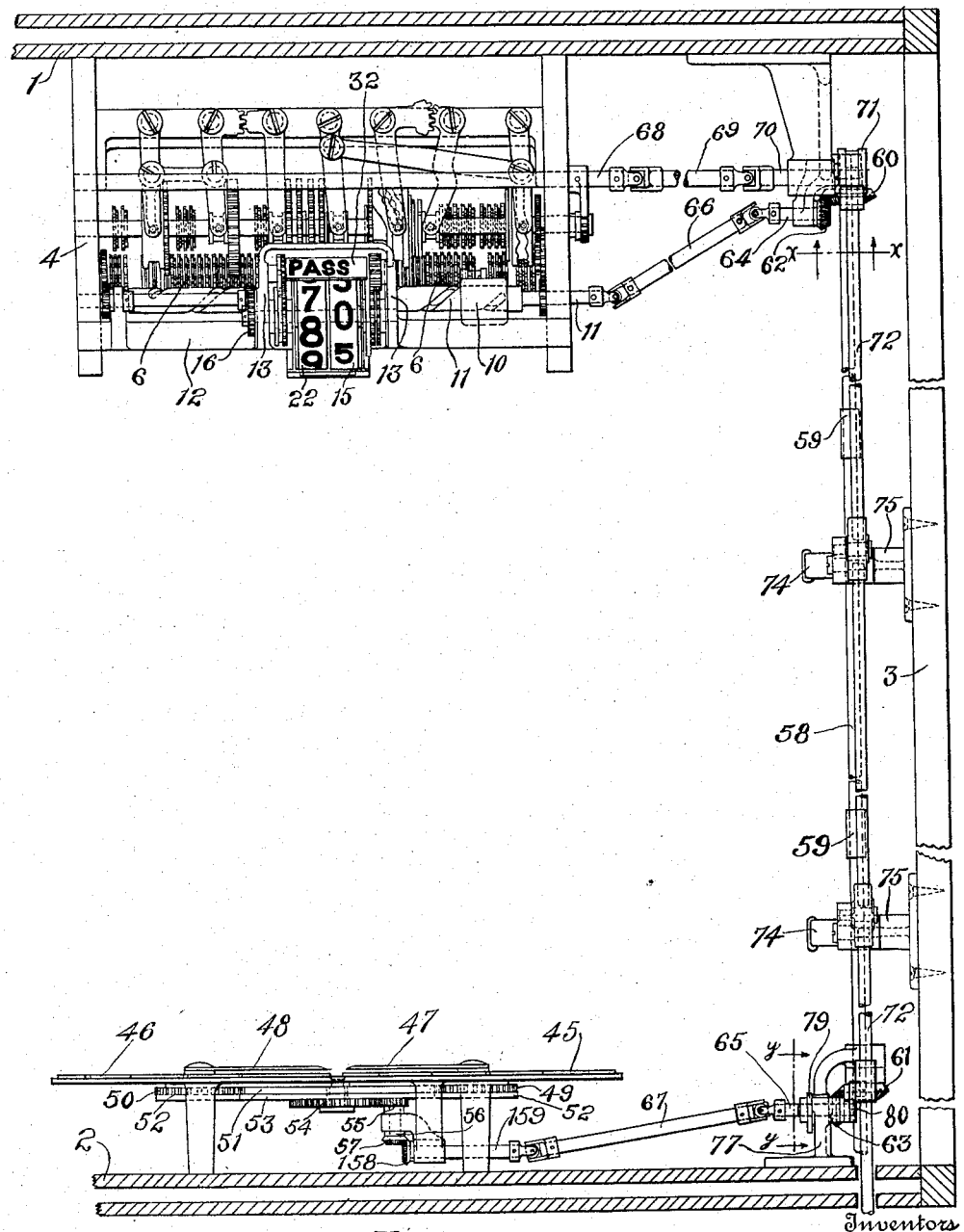

D. B. WHISTLER & J. E. McALLISTER.
INDICATING AND OPERATING MECHANISM.
APPLICATION FILED NOV. 8, 1912.

1,169,445.

Patented Jan. 25, 1916.
6 SHEETS—SHEET 1.

Witnesses
George E. Ireland,
Harriet L. Hammaker,

Inventors
David B. Whistler,
John E. McAllister,
By Tochumun & Reed
Attorneys

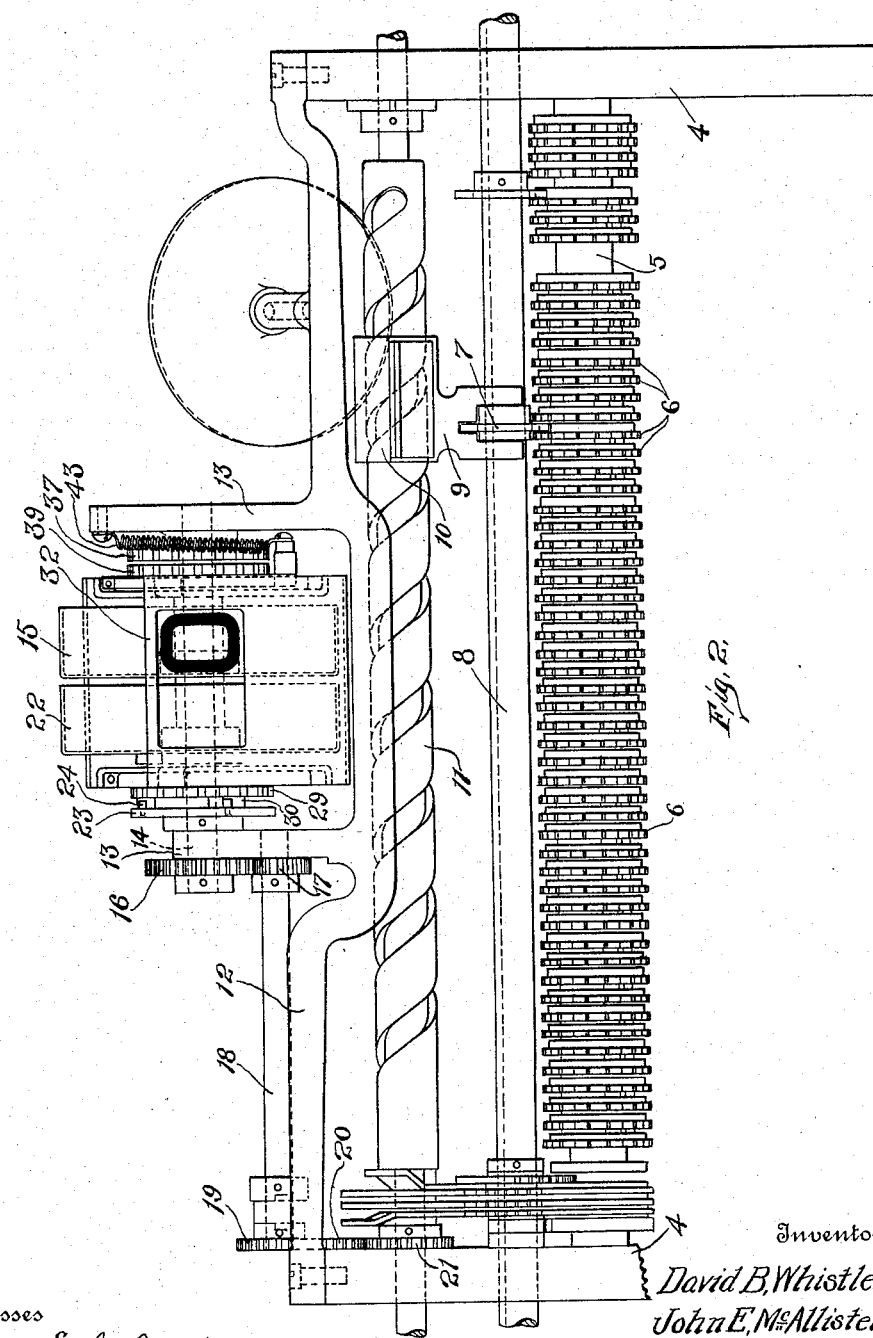

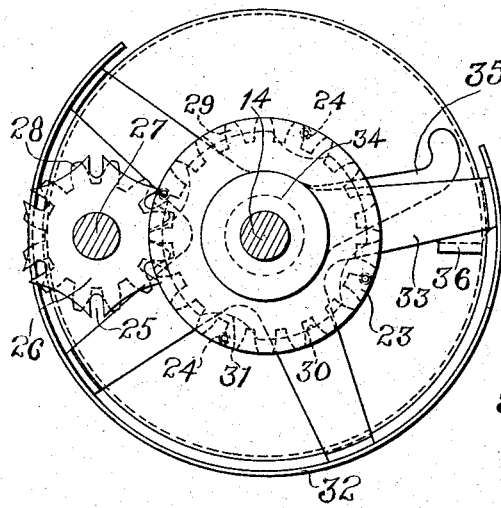
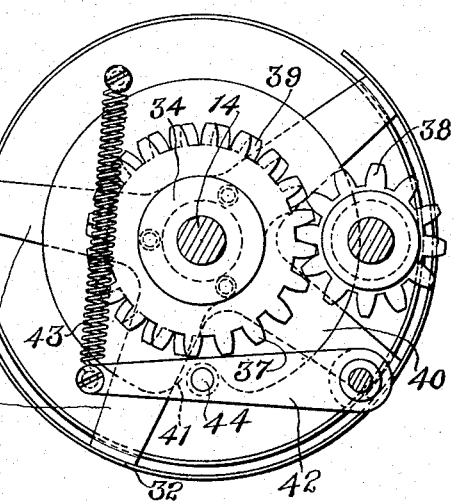
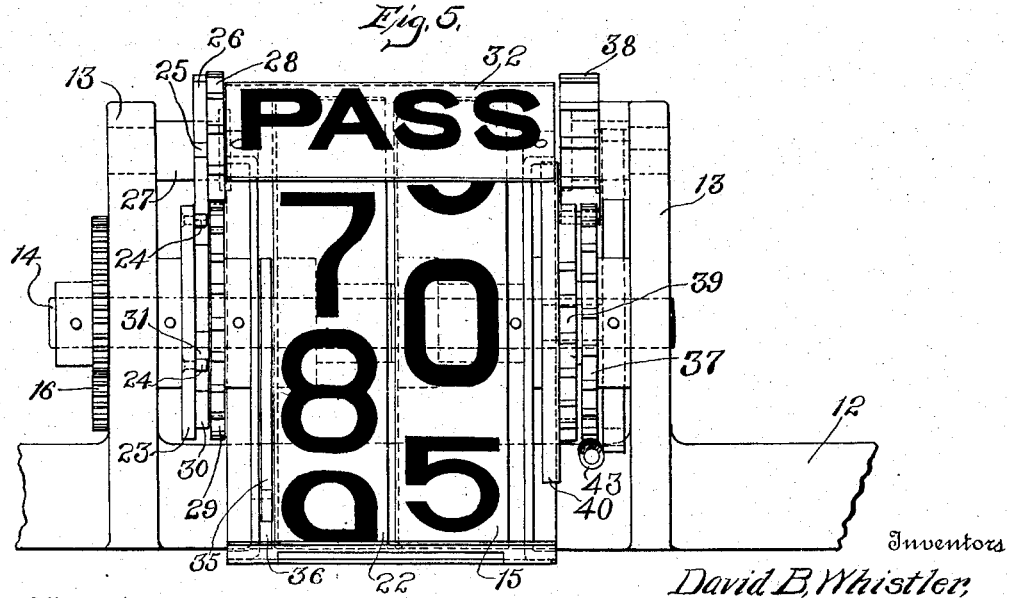

D. B. WHISTLER & J. E. McALLISTER.
INDICATING AND OPERATING MECHANISM.
APPLICATION FILED NOV. 8, 1912.
1,169,445.
Patented Jan. 25, 1916.
6 SHEETS—SHEET 4.
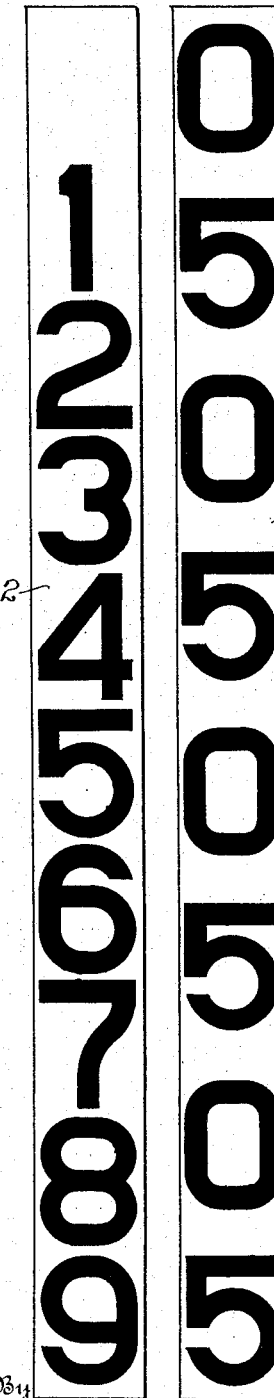
Witnesses
George E. Ireland.
Harriet L. Hammaker.
Inventors
David B. Whistler,
John E. McAllister,
By Toulmin & Reed
Attorneys.

D. B. WHISTLER & J. E. McALLISTER.
INDICATING AND OPERATING MECHANISM.
APPLICATION FILED NOV. 8, 1912.

1,169,445.

Patented Jan. 25, 1916.
6 SHEETS—SHEET 5.

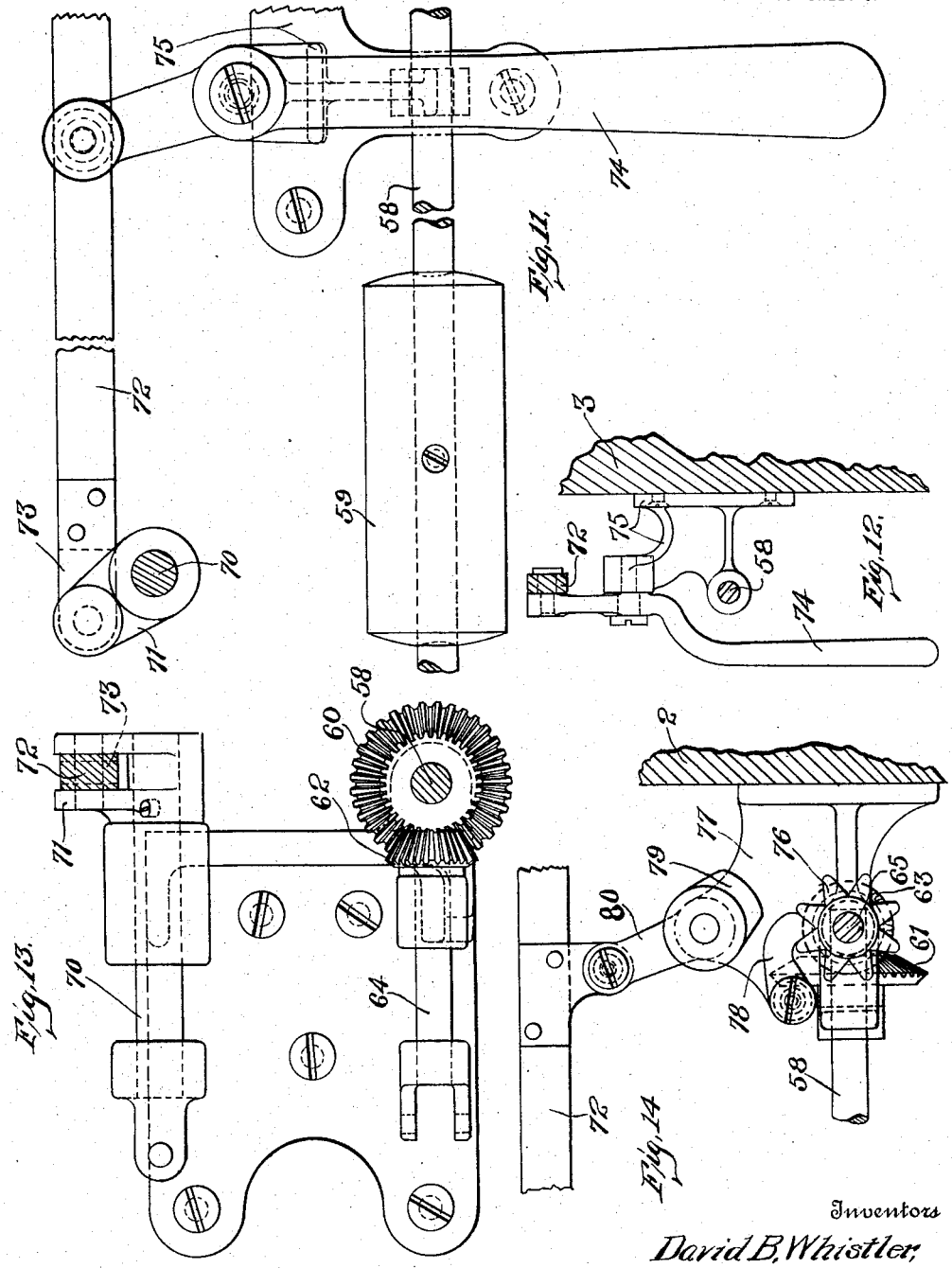

UNITED STATES PATENT OFFICE.

DAVID B. WHISTLER AND JOHN E. McALLISTER, OF DAYTON, OHIO, ASSIGNORS TO THE RECORDING AND COMPUTING MACHINES COMPANY, OF DAYTON, OHIO, A CORPORATION OF OHIO.

INDICATING AND OPERATING MECHANISM.

1,169,445.   Specification of Letters Patent.   Patented Jan. 25, 1916.

Application filed November 8, 1912. Serial No. 730,150.

*To all whom it may concern:*

Be it known that we, DAVID B. WHISTLER and JOHN E. MCALLISTER, citizens of the United States, residing at Dayton, in the county of Montgomery and State of Ohio, have invented certain new and useful Improvements in Indicating and Operating Mechanism, of which the following is a specification, reference being had therein to the accompanying drawing.

This invention relates to indicating and operating mechanism for use in connection with fare recorders and is designed more particularly for use in interurban electric cars or other cars either of great length or comprising a plurality of compartments.

As is well known interurban cars are usually not only of a very considerable length but they are often divided into two or more compartments by transverse partitions. Thus an indicator mounted at one end of the car, unless of unusual size, is not visible to all the passengers within the car and where the car is divided into compartments the indicator is not visible to all the passengers even though it may be very large. It is not only desirable that the indicator should be visible to the passengers as a check upon the conductor but it is also necessary that the indicator should be visible to the conductor in order that he may properly set the recorder to record the fares collected. It is desirable further that the indicator at that end of the car in which the recorder is mounted should be combined with the recorder and the most practical type of indicator which can be combined with the recorder is what is known as the decimal type. The recorders employed on interurban cars are adapted to record cash fares from five cents to a dollar in multiples of five and, at least, four paper fares. This requires an indicator capable of exhibiting twenty-four distinct indications.

The object of the present invention is to provide a decimal indicator adapted to exhibit the necessary indications in figures and letters large enough to be read at a considerable distance from the indicator and to combine therewith a dial indicator arranged in another part of the car to exhibit the same fare which is exhibited by the decimal indicator, said indicators being controlled in unison and coöperating in such a manner as to exhibit at all times to the conductor and the passengers in all parts of the car the class of the fare registered; to provide such a mechanism which will be simple in construction and positive in its operation and may be readily adjusted to indicate the desired fare regardless of the direction of movement of the operating device; to provide a double dial indicator adapted to exhibit these same fares, the total number of indications being divided between the two dials and each dial having a separate pointer, the pointer of each dial being adapted to point toward the other dial when the indication of the fare received is carried by said other dial; to provide means for positively locking said pointers and to properly time the movements thereof.

A further object is to provide a simple, easily operated mechanism for setting simultaneously both the decimal indicator, the double dial indicator and the recorder and for actuating the recorder to make a record of the fare indicated.

Further, it is an object of the invention to provide a mechanism which as a whole will be compact in its arrangement, strong and durable in its construction and the several parts of which will coöperate positively to accomplish the proper indication and recordation of the fares.

Figure 9:
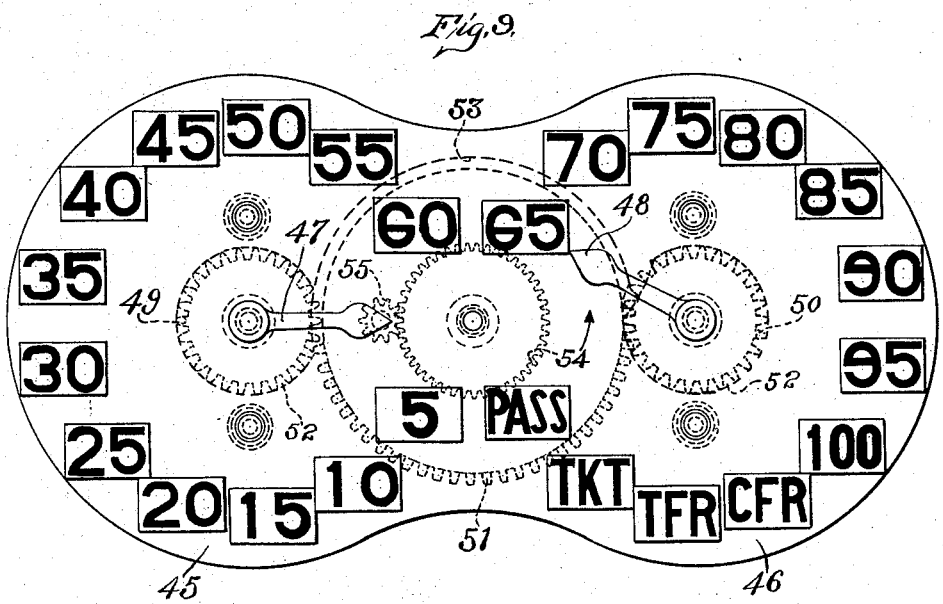
Figure 10:
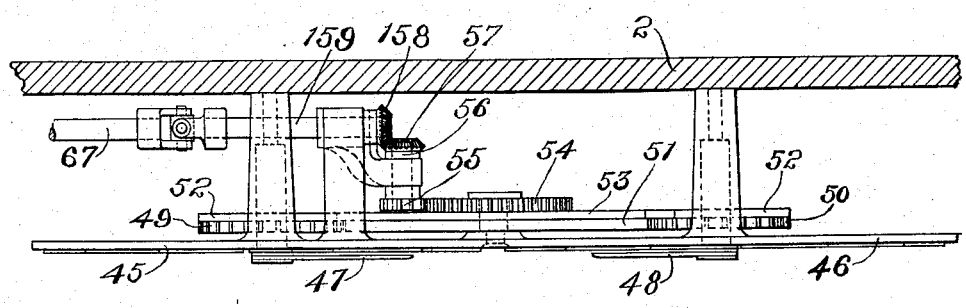

In the accompanying drawings, Figure 1 is a transverse, sectional view of a portion of a car showing in plan view our mechanism attached thereto; Fig. 2 is a front elevation of a recorder with parts of the same removed to show the operation of those parts thereof which are combined with the present invention and to show the manner of supporting the decimal indicator thereon; Fig. 3 is an end view of the indicating drum for the decimal indicator and their operating mechanism; Fig. 4 is an end view of the drums and their operating mechanism looking in a direction opposite that of Fig. 3; Fig. 5 is a front elevation of said drums and their operating mechanism; Fig. 6 is a lay-out of the drum carrying the indications for the dollar and the paper fares;

Fig. 7 is a lay-out of the units indicating drum; Fig. 8 is a lay-out of the tens indicating drum; Fig. 9 is a front elevation of the double dial indicator; Fig. 10 is a plan view of the same; Fig. 11 is a side elevation of a portion of the operating mechanism showing the devices for imparting rotatory and reciprocatory movement, respectively, to the two rods; Fig. 12 is a transverse, sectional view of the operating mechanism showing these devices in end elevation; Fig. 13 is a transverse, sectional view on the line $x$ $x$ of Fig. 1 and looking in the direction of the arrows; and Fig. 14 is a section taken on the line $y$ $y$ of Fig. 1 and looking in the direction of the arrows.

In these drawings we have illustrated one embodiment of our invention and have shown the same as applied to a car comprising end walls 1 and 2 and a side wall 3. This car is not shown as having transverse partitions dividing the compartments as this is not necessary to an understanding of the invention. The side wall of the car is broken away at places to shorten the length thereof but it will be understood that the interior arrangement and length of the car are optional with the user. Mounted upon one of the end walls, in the present instance, the wall 1, is a fare recorder adapted to record cash fares from five cents to a dollar in multiples of five and also to record a plurality of paper fares. These paper fares, in the present instance, are four in number and are shown as comprising the cash fare receipt, transfer ticket and pass. While various recording mechanisms may be used to take care of these fares we have here shown the recorder as comprising a main frame 4 in which is mounted a shaft 5 having thereon a plurality of groups of counter wheels 6, each group of wheels being adapted to count and record the fares of a single denomination. These counters are driven by an actuator 7 mounted to slide upon and to rotate with a shaft 8 which is also journaled in the main frame 4. Longitudinal movement is imparted to the actuator by means of a yoke 9 carried by a nut 10 mounted upon a screw-shaft 11 journaled in the main frame and adapted to have rotatory movement imparted thereto in any suitable manner. It will be apparent that by rotating the screw-shaft 11 the actuator 7 can be moved into operative relation with any one of the several groups of counters 6 and by imparting rotatory movement to the shaft and the actuator this counter can be caused to record a fare of that particular denomination. This recording mechanism is of a well known type and does not form a part of the present invention, it being chosen for the purpose of illustration only. An indicator is also located at the same end of the car with the recorder to guide the conductor in setting the latter and to indicate to the passenger the class or denomination of fare which has been recorded. While any suitable support may be provided for this indicator we have, in the present instance, shown it as built into the recorder and to this end one of the frame members 12 of the recorder is provided with arms 13 spaced apart to receive the indicating mechanism between them. Inasmuch as the indicator must exhibit indications ranging from five cents to a dollar and other indications comprising several letters, as distinguished from the figures of the cash fare designations, it will be apparent that the indicator must comprise two rows of numerals which can be moved into the desired relative positions and must also have some means for exhibiting the names or abbreviations indicating the paper fares. Preferably, the two rows of numerals are carried by two drums having relative movement, but to print the names of the paper fares upon one of these drums would reduce the size of the letters to such an extent that they could be read at short range only. We have, therefore, provided a third drum segmental in shape and of a width, in the present instance, greater than the combined width of the two drums carrying the numerals and having thereon the names of the paper fares, this drum being adapted to be moved into a position between the other drums and the sight opening for the indicator.

In that embodiment of the invention here illustrated we have mounted in the arms 13 a shaft 14 on which is rigidly secured a units drum 15 having thereon, alternately arranged, the figures 0 and 5, each figure appearing four times. The shaft 14 has mounted on the end thereof a gear 16 which meshes with a pinion 17 on a shaft 18 having on its outer end a gear 19 meshing with an idler 20, which, in turn, meshes with a gear 21 on the screw-shaft 11. In this manner the indicator shaft is rotated simultaneously with the rotation of the screw-shaft and the ratio of the gearing is such that the movement of the actuator 7 from one position to the next successive position in either direction will rotate the units drum 15 one step. A tens drum 22 is also mounted on the indicator shaft and is capable of movement relatively to the units drum. The tens drum carries the numerals 1 to 9, inclusive with a single blank space between the nine and the one. Inasmuch as the cash fares are registered in multiples of five it is necessary that the tens drum should move one space for every two steps of movement on the part of the units drum, hence the movement of the tens drum relatively to the units drum. This relative movement may be accomplished in various manners but, in the present instance, we have mounted on the indicator shaft 14 near the end of the hub of the drum 22 a disk 23 having thereon a series of pins 24 which, in the present indicator, are four in number and are adapted to engage slots 25 in a Geneva gear 26 loosely mounted on a second shaft 27, which latter is also mounted in the arms 13 forming the support for the indicator. Rigidly secured to the Geneva gear 26 is a toothed gear 28 which meshes with a gear 29 on the hub of the tens drum 22. Inasmuch as there are four of the pins 24 it will be apparent that movement will be imparted to the drum 22 four times during a complete rotation of the shaft 14 and, consequently, the tens drum will be advanced four steps for the eight steps of the units drum. The Geneva gear 26 is provided with the usual recessed portions between the slots 25 and a disk 30 is mounted between the disk 23 and the gear 29 and is of such a diameter that its periphery will enter the recesses in the Geneva gear 26 and lock the latter against movement. The disk 30 is secured to and rotates with the disk 23 and is provided with recesses 31 at points adjacent to the pins 24, thus providing a clearance which will permit the rotation of the Geneva gear. The third drum which carries the designations for the paper fares is segmental in shape, as indicated at 32, and is supported at each end by a spider 33 comprising a plurality of arms having a hub 34 at their inner ends and connected at their outer ends with the drum 32. These hubs are loosely mounted on the indicator shaft 14 and the rotation of this shaft does not affect the position of the segmental drum. It will be noted that in addition to the paper fare designations the segmental drum also carries the designation for the dollar fare, this requiring three figures which cannot be properly placed on two drums. Therefore, the mechanism is so constructed that the segmental drum will be moved into operative position upon the registration of a dollar fare or any one of the paper fares. The segmental drum is normally supported with its open side in alinement with the sight opening through which the indications are read, and is normally disconnected from the other drums and in order to operate the same an arm 35 is secured to the hub of the tens drum and arranged to engage a lip or plate 36 carried by one of the arms 33 supporting the segmental drum and move the same into indicating position. In the present arrangement of the indicator the arm 35 will be brought into engagement with or at a point adjacent to the plate 36 when a ninety cent fare is registered. If the next fare registered is a ninety-five cent fare the tens drum will not move and the position of the arm 35 will not be changed. If, however, the next fare is a dollar fare, then the tens drum will advance one space and the arm 35 will lift the segmental drum a distance sufficient to cause the indication for the dollar fare to move into visible position. Inasmuch as the tens drum only moves one space for every two spaces of the units drum it is necessary that some auxiliary mechanism should be provided which will advance the segmental drum in unison with the units drum. To this end we have mounted on the indicator shaft 14 a gear 37 meshing with a gear 38 loosely mounted on the shaft 27. Rigidly secured to the hub of the spider 33 which supports the adjacent end of the segmental drum is a toothed segment 39 adapted to engage the gear on the shaft 27. Preferably, the gear 38 is of a width sufficient to mesh with both the gear 37 and the toothed segment 39, but it is not essential that a single gear should be used. When the indicator is set to indicate a cash fare other than a dollar fare the toothed segment 39 will be out of mesh with the gear 38. However, the rotation of the segmental gear to cause the same to indicate the dollar fare will move the toothed segment 39 into mesh with the gear 38 and, consequently, any further forward movement of the indicator shaft will be transmitted to the segmental drum or paper fare indicator drum.

The segmental drum is held against accidental displacement by means of a disk 40 secured to the arms at one end thereof and having a notch or recess 41 in its periphery. An arm 42 is pivotally connected at one end to a fixed part of the machine and is connected at its other end with a spring 43 which tends to move it toward the indicator shaft 14. A suitable stop, such as a pin 44, is mounted on the arm 42 between its ends and is adapted to enter the recess in the disk 40 and thus lock the disk and the segmental drum against movement until positive force is applied thereto. A second indicator is mounted in the car at a point remote from the first indicator and is here shown as mounted at the opposite end of the car and facing the first-mentioned indicator. This second indicator preferably comprises two dials 45 and 46 which are here shown as formed in a single piece. The dial 45 carries upon its face the fare designations 5 to 60, while the dial 46 carries the designations 65 to a dollar and the four paper fare designations. Mounted centrally of each dial is a pointer, these pointers, in the present instance, being indicated at 47 and 48. These pointers are rotated by means of gears 49 and 50 rigidly secured thereto on the opposite side of the dial. Arranged between the gears 49 and 50 is a gear 51 having teeth arranged about a part of its periphery only, these teeth being so arranged that when the gear 49 is in mesh with the gear 51 the gear 50 will be out of mesh with the gear 51 and vice versa. As shown in Fig. 9 the toothed portion of the gear 51 has just cleared the gear 49 and has just meshed with the gear 50. The normal positions of the pointers 47 and 48 are substantially horizontal and pointing toward the axis of the gear 51. Thus, it will be seen that so long as the fare to be indicated is sixty cents or less the pointer 47 will travel over the face of its dial to indicate the desired fare, while the pointer 48 will lie in a substantially horizontal position pointing toward the dial 45, and, when the fare is sixty-five cents or above or is a paper fare, it will be indicated by the pointer 48, while the pointer 47 will point toward the dial 46. It will be noted, of course, that neither dial contains any fare designation on that portion of its surface lying between the axis of its pointer and the axis of the gear 51.

Rigidly secured to the gears 49, 50 and 51 and adapted to rotate therewith are locking plates 52 and 53 having peripheries provided with curved recesses in a well known manner, whereby, when the plate 53 is in one position its periphery will lie within the recess of one of the plates 52 and its recessed portion will lie in a position to receive the periphery of the other plate. Thus, the first plate will be locked and the second plate released. Rotatory movement is imparted to the several gears, preferably by means of a driving gear 54 mounted on the rear end of the shaft carrying the gear 51 and meshing with a pinion 55 on a short shaft 56 having at its opposite end a bevel gear 57 meshing with a second bevel gear 158 on a shaft 159 which is adapted to be connected with suitable operating mechanism.

We preferably provide a single mechanism for simultaneously actuating the two indicators to cause the same to indicate the same fare and to move the actuator for the recorder into operative relation with the counter for that fare. In the present instance, we have mounted along the side wall 3 of the car a rotary shaft or setting rod 58 having at intervals thereon hand pieces or gripping devices 59 by means of which it may be grasped and rotated in either direction. At its opposite ends it is provided with bevel gears 60 and 61 meshing with other gears 62 and 63 secured to short shafts 64 and 65 which are connected by means of universal joints and shaft sections 66 and 67 with the setting shaft 11 and the driving shaft 159 for the dial indicator, respectively. Thus, the rotation of the shaft or rod 58 will actuate the setting shaft to set the recorder and through the rotating of the setting shaft 65 will set the decimal indicator to indicate the fare which the recorder is set to register and at the same time will adjust the pointer on the dial indicator to indicate this same fare. The actuator shaft 8 of the recorder is driven through suitable gearing from a shaft 68 which is connected by a link 69 and suitable universal joints with a rock-shaft 70 having at one end a bifurcated crank arm 71 adapted to be pivotally connected with the longitudinal reciprocating rod 72, the connection being preferably made by means of a flattened head 73 carried by the rod and extending between the side portions of the bifurcated crank arm and pivotally connected thereto. Reciprocatory movement may be imparted to the rod 72 in any suitable manner. Preferably, however, this is accomplished by means of a handle 74 pivotally mounted between its ends on a bracket 75 and having the hand grip portion thereof extending downward into an accessible position and having its upper end pivotally connected with the shaft 72.

It will be noted that the axis of support for the handle 74, as well as of the pivotal connection of the handle with the rod 72 is about an axis at right angles to the rod. Consequently, the movement of the handle about its axis will impart longitudinal movement to the rod 72 and this movement will be transmitted to the indicators and the recorder. If desired the actuating device may also be provided with means to aline the indicators and lock the same in their adjusted positions. We have, in the present mechanism, provided such an alining device and have shown the same as comprising a star wheel 76 secured to the short shaft 65 which forms a part of the connection between the rotary rod 58 and the dial indicator. Pivotally mounted on a bracket 77, which provides a bearing for the shaft 65, is a pawl 78 having a V-shaped nose adapted to enter between the teeth of the star wheel. If the indicator has stopped short of its correct position the forcing of the nose of the pawl 78 into the space between the adjacent teeth of the star wheel will serve to impart the necessary rotation to the shaft to complete the movement of the indicators, and, so long as the nose is in engagement with the star wheel, the rotary rod 58 and the whole train of mechanism connected therewith may be locked against movement. This locking is preferably accomplished by the reciprocation of the rod 72 and to this end a shaft is mounted on the bracket 77 and carries a locking finger 79, the lower portion of which is curved and is adapted to be moved into and out of engagement with the upper surface of the pawl 78. A rock arm 80 is connected with the shaft carrying the locking plate 79 and with the rod 72 and when the rod 72 is moved in a direction to actuate the recorder the locking plate will be caused to engage the pawl and, if the same has not already been moved to a central position with relation to the star wheel, it will be forced into that position, thereby alining the actuator and the indicator and locking the parts in their adjusted positions.

While we have shown and described one embodiment of our invention it will be understood that this has been chosen for the purpose of illustration only, and that we do not desire to be limited to the details of construction shown and described, for obvious modifications will occur to a person skilled in the art.

Having thus fully described our invention, what we claim as new and desire to secure by Letters Patent, is:—

1. A fare indicator comprising a units drum and a tens drum, and a third drum supported adjacent to said first-mentioned drums and having fare indications thereon, means for adjusting the first-mentioned drums to indicate a given fare, and means controlled by the movement of one of said first-mentioned drums to move said third drum into a position to exhibit one of the indications thereon and to conceal the indication on the first-mentioned drums.

2. In a fare indicator, a units drum and a tens drum capable of relative movement and each having a series of figures thereon, means for actuating said units drum, means controlled by said units drum for actuating said tens drum, a third drum having a part movable over the first-mentioned drums, said part having a fare designation thereon, and means actuated by the movement of said first-mentioned drums to impart movement to the third drum to cause it to exhibit said fare designation and conceal the first-mentioned drums.

3. In a fare indicator, a units drum and a tens drum, each of said drums having a series of figures thereon, driving mechanism connected with one of said drums, means controlled by the movement of the first-mentioned drum for imparting movement to the second drum, a third drum having a part provided with a series of designations thereon and movable over the first-mentioned drums, and means controlled by the movement of one of said first-mentioned drums to impart the initial movement to said third drum, and means controlled by the other of said first-mentioned drums to impart further movement to said third drum.

4. In a fare indicator, a shaft, a drum secured thereto and having figures on the periphery thereof, a second drum loosely mounted on said shaft, gearing connecting said second drum with said shaft to cause it to advance one step for each two steps the first-mentioned drum is advanced, a third drum rotatably mounted on said shaft on a longer radius than the first-mentioned drums and having designations on the periphery thereof, and means movable with said second drum to engage a part carried by the third drum and impart movement thereto when said second drum has been moved past a predetermined position.

5. In a fare indicator, a shaft, a drum secured thereto and having figures on the periphery thereof, a second drum loosely mounted on said shaft, gearing connecting said second drum with said shaft to cause it to advance one step for each two steps the first-mentioned drum is advanced, a third drum rotatably mounted on said shaft on a longer radius than the first-mentioned drums and having designations on the periphery thereof, means movable with said second drum and adapted to engage a part carried by the third drum to impart movement thereto when said second drum has been moved past a predetermined position, and driving mechanism connected with said shaft and normally disconnected from said drum but adapted to be connected with said drum by the first movement of the latter.

6. An indicator comprising a shaft, means for rotating the same, a drum mounted on said shaft and having the figures 0 to 5 alternately arranged on the periphery thereof, a second drum loosely mounted on said shaft and having the figures 1 to 9 on the periphery thereof, gearing connecting said second drum to said shaft to cause the same to advance one step for each two steps advanced by the first-mentioned drum, a third drum mounted on said shaft and extending across the peripheries of the first-mentioned drums, said third drum having a portion of its periphery cut away to expose corresponding portions of said first-mentioned drums, said third drum also having fare indications thereon, a member carried by said second drum and adapted to engage a part carried by said third drum and operate the same when said second drum is moved past its ninth position.

7. An indicator comprising a shaft, means for rotating the same, a drum mounted on said shaft and having the figures 0 and 5 alternately arranged on the periphery thereof, a second drum loosely mounted on said shaft and having the figures 1 to 9 on the periphery thereof, gearing connecting said second drum to said shaft to cause the same to advance one step for each two steps advanced by the first-mentioned drum, a third drum mounted on said shaft and extending across the peripheries of the first-mentioned drums, said third drum having a portion of its periphery cut away to expose corresponding portions of said first-mentioned drums, said third drum also having fare indications thereon, an arm movably secured to said second drum and adapted to engage a part carried by said third drum and operate the same when said second drum is moved past its ninth position, a gear secured to said indicator shaft, a pinion meshing with said gear, and a segment connected with said third drum and adapted to be moved into mesh with said pinion when the first movement is imparted to said third drum, whereby further movement will be imparted to said drum by the rotation of said shaft.

8. An indicator comprising a shaft, means for rotating the same, a drum mounted on said shaft and having the figures 0 and 5 alternately arranged on the periphery thereof, a second drum loosely mounted on said shaft and having the figures 1 to 9 on the periphery thereof, gearing connecting said second drum to said shaft to cause the same to advance one step for each two steps advanced by the first-mentioned drum, a third drum mounted on said shaft and extending across the peripheries of the first-mentioned drums, said third drum having a portion of its periphery cut away to expose corresponding portions of said first-mentioned drums, said third drum also having fare indications thereon, an arm movably secured to said second drum and adapted to engage a part carried by said third drum and operate the same when said second drum is moved past its ninth position, a gear secured to said indicator shaft, a pinion meshing with said gear, and a segment connected with said third drum and adapted to be moved into mesh with said pinion when the first movement is imparted to said third drum, whereby further movement will be imparted to said drum by the rotation of said shaft, and means for locking said third drum normally against movement.

9. A fare indicator comprising two dials, said dials having a series of indications arranged thereon, a part of said indications being on one dial and a part on the other, a pointer for each dial, and means to successively operate said pointers to cause one of them to indicate the fare received.

10. A fare indicator comprising two dials, said dials having a series of indications arranged thereon, a part of said indications being on one dial and a part on the other, a pointer for each dial, and means to actuate said pointers to cause one of them to indicate the specific indication and to cause the other to point toward the dial carrying said specific indication.

11. A fare indicator comprising two dials, said dials having a series of indications arranged thereon, a part of said indications being on one dial and a part on the other, a pointer for each dial, gears connected with the respective pointers, a segmental gear having its toothed portion arranged to mesh alternately with said first-mentioned gears, whereby said pointers will be actuated one at a time.

12. An indicator comprising two dials each having different fare designations on the face thereof, a pointer rotatably mounted on each of said dials and lying normally in a horizontal position with its point extended toward the other dial, a gear secured to each of said pointers to actuate the same, a mutilated gear arranged between the first-mentioned gear and having teeth on one side thereof only, said teeth being arranged to move out of mesh with one gear when they move into mesh with the other, and means for rotating said mutilated gear.

13. An indicator comprising two dials each having different fare designations on the face thereof, a pointer rotatably mounted on each of said dials and lying normally in a horizontal position with its point extended toward the other dial, a gear secured to each of said pointers to actuate the same, a mutilated gear arranged between the first-mentioned gear and having teeth on one side thereof only, said teeth being arranged to move out of mesh with one gear when they move into mesh with the other, means for rotating said mutilated gear, and coöperating locking disks secured to the respective gears.

14. In an operating mechanism comprising a reciprocatory rod and a rotary rod, a star wheel secured to said rotary rod, a pawl mounted on a fixed support and adapted to engage said star wheel, a locking arm pivotally mounted on a fixed support and adapted to engage said pawl, and a connection between said locking arm and said reciprocatory rod to move the arm into and out of engagement with said pawl.

15. In a mechanism of the character described, a rotary setting device, means for imparting rotary movement thereto, a star wheel secured thereto, a pawl mounted on a fixed support and adapted to engage said star wheel, a locking arm arranged to engage said pawl to lock the same in engagement with said star wheel, and a reciprocatory member operatively connected with said locking member.

16. In a mechanism of the character described, the combination, with a rotary setting rod, a rotary actuating rod extending at right angles to said setting rod, a reciprocatory operating rod extending parallel to said actuating rod, a star wheel secured to said setting rod, a pawl pivotally mounted on a fixed support and having a V-shaped nose adapted to enter between the teeth of said star wheel, a locking arm pivotally mounted on said support and having a curved end to engage said pawl to force the same into a central position with relation to said star wheel and to lock the same in such position, and an operative connection between said arm and said reciprocatory rod.

In testimony whereof, we affix our signatures in presence of two witnesses.

DAVID B. WHISTLER.
JOHN E. McALLISTER.

Witnesses:
F. W. SCHAEFER,
HARRIET L. HAMMAKER.

Copies of this patent may be obtained for five cents each, by addressing the "Commissioner of Patents, Washington, D. C."